(12) United States Patent
Ngo

(10) Patent No.: US 6,601,997 B2
(45) Date of Patent: *Aug. 5, 2003

(54) FIBER OPTIC CABLE GUIDE BOOT

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 16 days.

This patent is subject to a terminal disclaimer.

(21) Appl. No.: 09/836,091

(22) Filed: Apr. 17, 2001

(65) Prior Publication Data

US 2002/0150352 A1 Oct. 17, 2002

(51) Int. Cl.[7] .................................................. G02B 6/36
(52) U.S. Cl. .............................. 385/86; 385/86; 385/87
(58) Field of Search ....................................... 385/86, 87

(56) References Cited

U.S. PATENT DOCUMENTS

| | | | |
|---|---|---|---|
| 5,073,044 A | 12/1991 | Egner et al. | 385/86 |
| 5,138,678 A | 8/1992 | Briggs et al. | 385/86 |
| 5,202,942 A * | 4/1993 | Collins et al. | 385/87 |
| 5,329,603 A * | 7/1994 | Watanabe et al. | 385/86 |
| 5,347,603 A | 9/1994 | Belenkiy et al. | 385/86 |
| 5,390,272 A | 2/1995 | Repta et al. | 385/100 |
| 5,425,119 A * | 6/1995 | Lee et al. | 385/86 |
| 5,530,787 A | 6/1996 | Arnett | 385/137 |
| 5,570,443 A | 10/1996 | May et al. | 385/75 |
| 5,640,476 A | 6/1997 | Womack et al. | 385/86 |
| 5,710,851 A | 1/1998 | Walter et al. | 385/86 |
| 5,781,681 A | 7/1998 | Manning | 385/86 |
| 5,892,871 A | 4/1999 | Dahan et al. | 385/86 |
| 5,933,557 A | 8/1999 | Ott | 385/86 |
| 6,019,521 A | 2/2000 | Manning et al. | 385/77 |
| 6,130,983 A | 10/2000 | Cheng | 385/139 |
| 6,134,370 A | 10/2000 | Childers et al. | 385/135 |

OTHER PUBLICATIONS

Corning Incorporated Product Information Sheet, "Corning 62.5/125 CPC6, Multimode Optical Fiber," 1996.
Corning Incorporated Product Information Sheet, "Corning 50/125 CPC6, Multimode Optical Fiber," 1996.

* cited by examiner

Primary Examiner—Akm E. Ullah
Assistant Examiner—Jennifer Doan
(74) Attorney, Agent, or Firm—Woodcock Washburn LLP

(57) ABSTRACT

An optical fiber connector for a fiber optic ribbon cable includes a guide boot and a termination plug. The guide boot comprises an outer sleeve or body that defines an inner passageway, and a first end for receiving the cable and a termination port. The body has an inner passageway for guiding, bending, and/or twisting the cable and is angled at a desired angle. The inner passageway is preferably tapered or otherwise spiraled to control the location and amount of circumferential rotation (twisting) of the cable. Alternately, the cable can be inserted into and through the guide boot without any twisting, and then twisted or otherwise rotated when the guide boot is connected with the termination plug. Locking tabs are preferably provided in an end of the termination plug to engage the termination port, thereby holding the guide boot in connection with the termination plug.

24 Claims, 11 Drawing Sheets

FIBER OPTIC CABLE GUIDE BOOT

FIELD OF THE INVENTION

The present invention relates in general to fiber optic cable or ribbon connectors, and more particularly, the present invention relates to a guide boot for fiber optic cables that allows a fiber optic cable to be bent, twisted or rotated without damaging the optical fiber in the cable or affecting signal quality.

BACKGROUND OF THE INVENTION

Optical fibers are used in a variety of applications ranging from large scale telephonic communication systems to laser surgery, and generally include a transparent core made, for example, of glass surrounded by cladding which is also made of transparent material but has a different index of refraction than the core. The core and cladding are enclosed by a protective flexible jacket. Connectors are used to join fibers to each other and to active or passive optical components such as sources, detectors, repeaters, switches, and attenuators.

As is well known in fiber optics, bending or twisting fiber optic cable too sharply can lead to a reduction in the signal transmission quality of the cable. However, it is necessary to be able to bend fiber optic cables in order to route the cables within, to and from equipment such as computers, connector panels, junctions boxes, etc. Accordingly, fiber optic cables are evaluated to determine a minimum bend radius. As long as a fiber optic cable is bent at a radius that is equal to or greater than the minimum bend radius, there should be no reduction in the transmission quality of the cable. However, if a fiber optic cable is bent at a radius below the minimum bend radius determined for such cable, there is a potential for a reduction in signal transmission quality through the bend.

The process of terminating the fiber optic cable in a connector is commonly referred to as "connectorization." The point at which a fiber optic cable extends into a connector joined on the end of the cable is an especially susceptible point of the cable bending below the minimum bend radius of the cable. To prevent such unacceptable bending, it is well known to install reinforcing boots during connectorization that extend out from the connector and encase a length of the cable extending from the connector. Such boots are permanently installed during connectorization. These boots provide enough reinforcement to limit the bend radius of the cable at the cable/connector junction.

However, there are problems in relying merely on reinforcing boots to prevent excessive bending of the fiber optic cable. For example, hundreds of fiber optic cables are commonly routed through and connected in connector panels or junction boxes with limited space. The connectors of such fiber optic cables are commonly inserted into horizontally oriented connectors that are arranged in a vertical panel in the junction box. The cables are routed in a direction perpendicular to their connector. The door of such junction boxes is also vertical and typically closes in a plane parallel to the panel of connectors. The space between the closed door and the panel of connectors is desired to be as small as possible; however, if the space is too small, the door will excessively bend the boot encased portion of the cable when it is closed.

Right angle boots are typically more rigid than the typical straight boot.

Thus, a need exists for a guide boot that can receive a fiber optic cable or ribbon and circumferentially rotate or twist the cable and insure that the cable will not be excessively bent. Additionally, such a guide needs to be removably installable.

SUMMARY OF THE INVENTION

The present invention is directed to an optical fiber connector for a fiber optic ribbon cable that includes a guide boot and a termination plug. The guide boot comprises an outer sleeve or body that defines an inner passageway, and has a first end for receiving the cable and a termination port. The inner passageway is dimensioned to allow a user to insert a cable through the passageway. The body with the inner passageway is used for guiding the cable while also allowing the cable to bend and to twist. The body is angled at the desired angle (ensuring a satisfactory radius of curvature), such as about 45 degrees or about 90 degrees. The body preferably has an outer diameter that decreases toward the first end. The inner passageway is preferably round in cross-section and tapered along its length. Preferably, the cable is inserted into and through the guide boot without any twisting, and the cable can thereafter be twisted or otherwise rotated when the guide boot is connected with the termination plug.

The termination plug has a first end to connect with the guide boot using, for example, a friction fit. Locking tabs are preferably provided in the end to engage the termination port of the guide boot, thereby holding the guide boot in connection with the termination plug. The cable passes through the termination plug.

The foregoing and other aspects of the present invention will become apparent from the following detailed description of the invention when considered in conjunction with the accompanying drawings.

DESCRIPTION OF EXEMPLARY EMBODIMENTS AND BEST MODE

Figure 1:
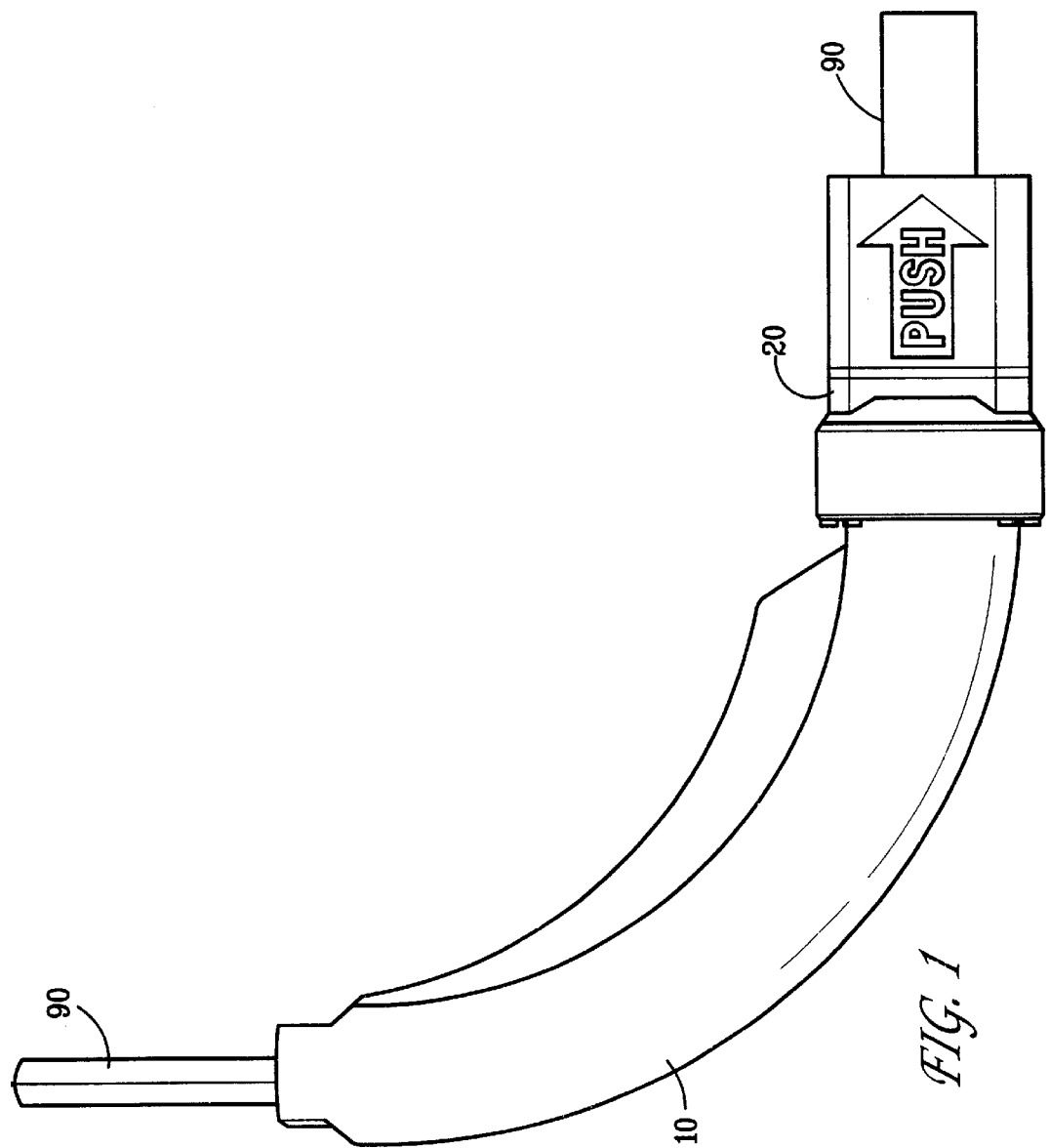
FIG. 1 is a perspective view of an exemplary guide boot with termination plug in accordance with the present invention.

FIG. 1 is a perspective view of an exemplary two-piece guide boot assembly with an angled section 10 and a straight section 20. A fiber optic cable 90 is shown extending through the guide boot 10 and straight section 20. The construction and design of fiber optic cable is known. Fiber optic cables may consist of a pair (or more) of thin channels or optic fibers formed of glass. The thin glass fibers are typically coated with ultraviolet-curable material for protection. The coated fibers are then covered with a thermoplastic material having sufficient stiffness to preclude fiber buckling. Strength yarns or other suitable strength members surround the coated and covered fibers to withstand tensile forces, which can be caused by pulling on the fiber optic cable, which could otherwise break the fibers. An outer jacket, which may be made of polyvinyl chloride, surrounds the coated and covered fibers and the strength yarns. The fiber optic cable 90 can be a fiber optic ribbon cable that is flexible, bendable, and twistable. As described earlier, the bend and twist of the cable must be controlled to limit signal loss.

Figure 2:
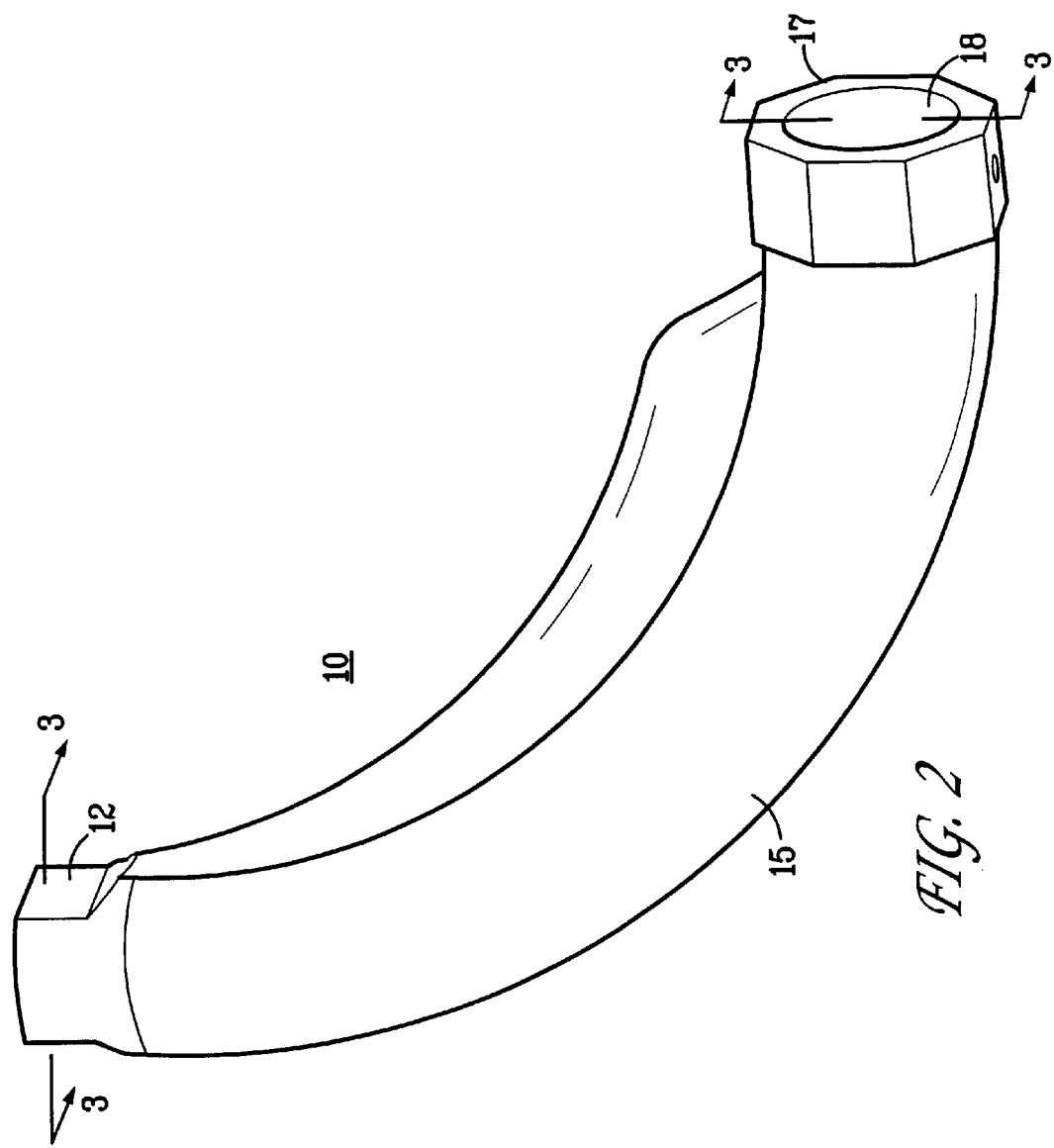
FIG. 2 is a perspective view of an exemplary guide boot in accordance with the present invention.

FIG. 2 is a perspective view of guide boot 10. The guide boot 10 comprises an outer sleeve or body 15 that defines an inner passageway, and has a first end 12 for receiving the cable 90 and a termination port 17 through which cable 90 extends. The inner passageway is dimensioned to allow a user to insert a cable through the passageway. The portion of body 15 that defines the inner passageway is used for guiding, bending, and/or twisting (if desired) the cable 90. The body 15 is angled at a desired angle (ensuring a satisfactory radius of curvature), such as about 45 degrees or about 90 degrees, though any angle can be used as long as it does not affect the signal transmission of the cable 90. The body 15 preferably has an outer diameter that decreases toward the first end 12. The curved body 15 is preferably molded from a suitable non-flammable elastic material such as plastic.

The first end 12 of guide boot 10 has an opening 13 (see FIG. 6) shaped similarly to the shape of cable 90 extending through the passageway. Preferably, opening 13 is rectangular or oval shaped and slightly larger than cable 90. The termination port 17 acts as a lock ring and is adapted to connect to the termination plug 20. The termination port 17 has an opening 18 that is preferably round, but may be any shape that does not interfere with the ability of cable 90 to twist within the boot. The exterior of the termination port 17 is preferably shaped to be detachably connectable with the termination plug 20 (having an associated or complementary shape to receive the termination port 17 at multiple positions). The exterior of the termination port 17 can be any shape, such as the octagonal shape depicted in FIGS. 2 and 6, as long as it can be appropriately connected with the termination plug 20 and serves to prevent first boot section 10 from rotating relative to second boot section 20 after being secured together.

Figure 3:
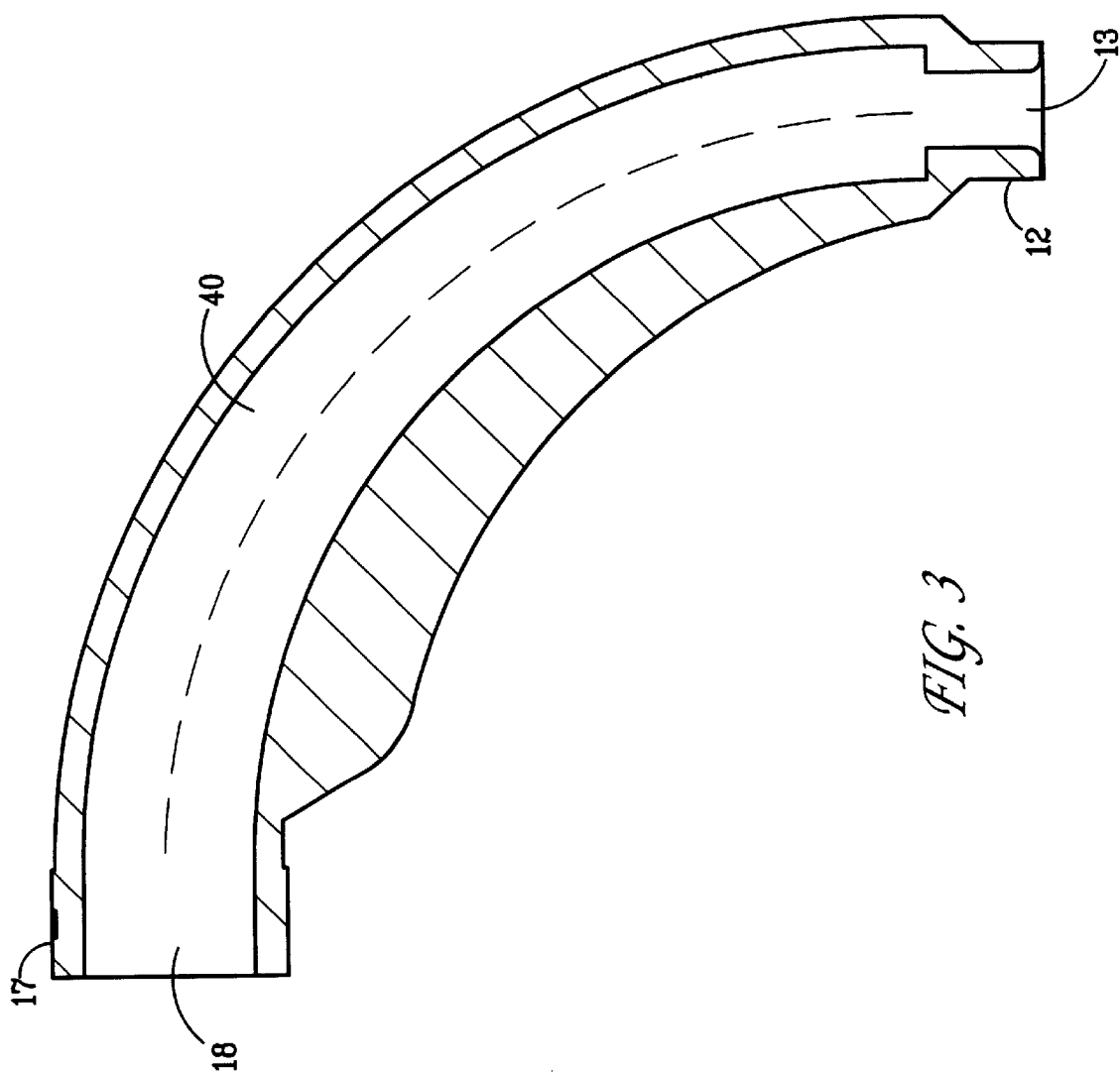
FIG. 3 is a section view taken along the line 3—3 in FIG. 2.

As seen in FIG. 3, the inner passageway 40 is preferably tapered so as not to interfere with the twisting of cable 90. Preferably, cable 90 is inserted into and through the guide boot 10 without any twisting (See FIG. 6), and the cable 90 is thereafter twisted or otherwise rotated immediately before the guide boot 10 is connected with the termination plug 20 (See FIG. 7).

Figure 4:
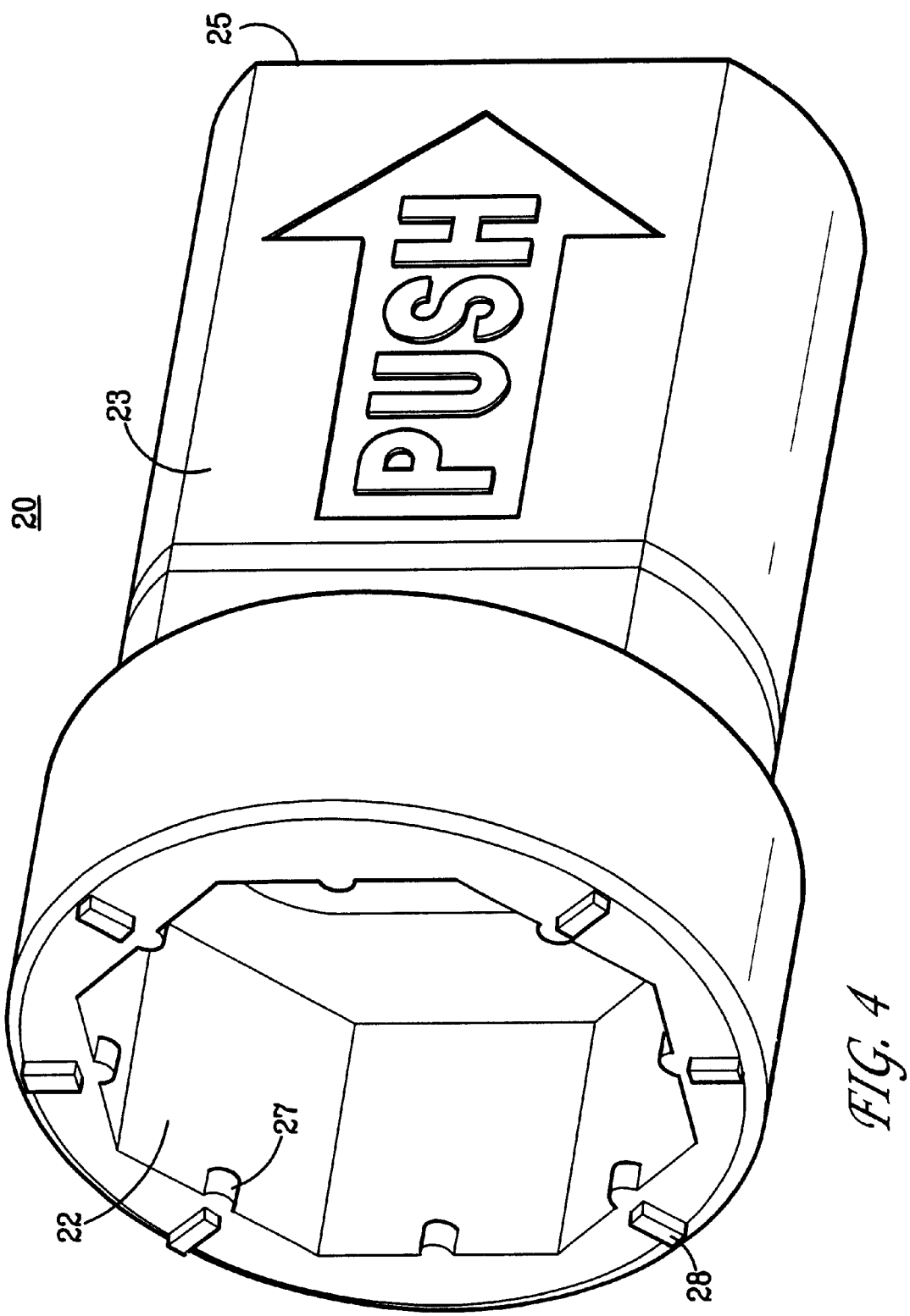
FIG. 4 is a perspective view of an exemplary termination plug in accordance with the present invention.

FIG. 4 is a perspective view of an exemplary termination plug 20. The termination plug 20 has a first end 22 (shown here as having an interior octagonal-shape) to receive the cable 90 and to connect with the guide boot 10 using, for example, a friction fit in which an interior of the first end 22 grips the exterior of the termination port 17. For example, in such an embodiment, a user would first rotate boot section 10 and then manually press the termination port 17 into the first end 22. Locking tabs 27 are preferably provided in the end 22 to engage the termination port 17 of the guide boot 10, thereby holding the guide boot in connection with the termination plug. Corresponding notches or openings can be provided in the termination port to engage the locking tabs 27 or alignment marks 28. The termination plug 20 has a second end 25 that may receive a portion of connector 100, or be adapted to connect with a panel or other device (not shown). In this manner, the cable 90 is provided to a connector, the panel or other device. Preferably, a straight boot portion 23 is disposed between the ends 22, 25. Alternatively, boot section 20 could be part of the optical connector where cable 90 terminates.

Figure 5:
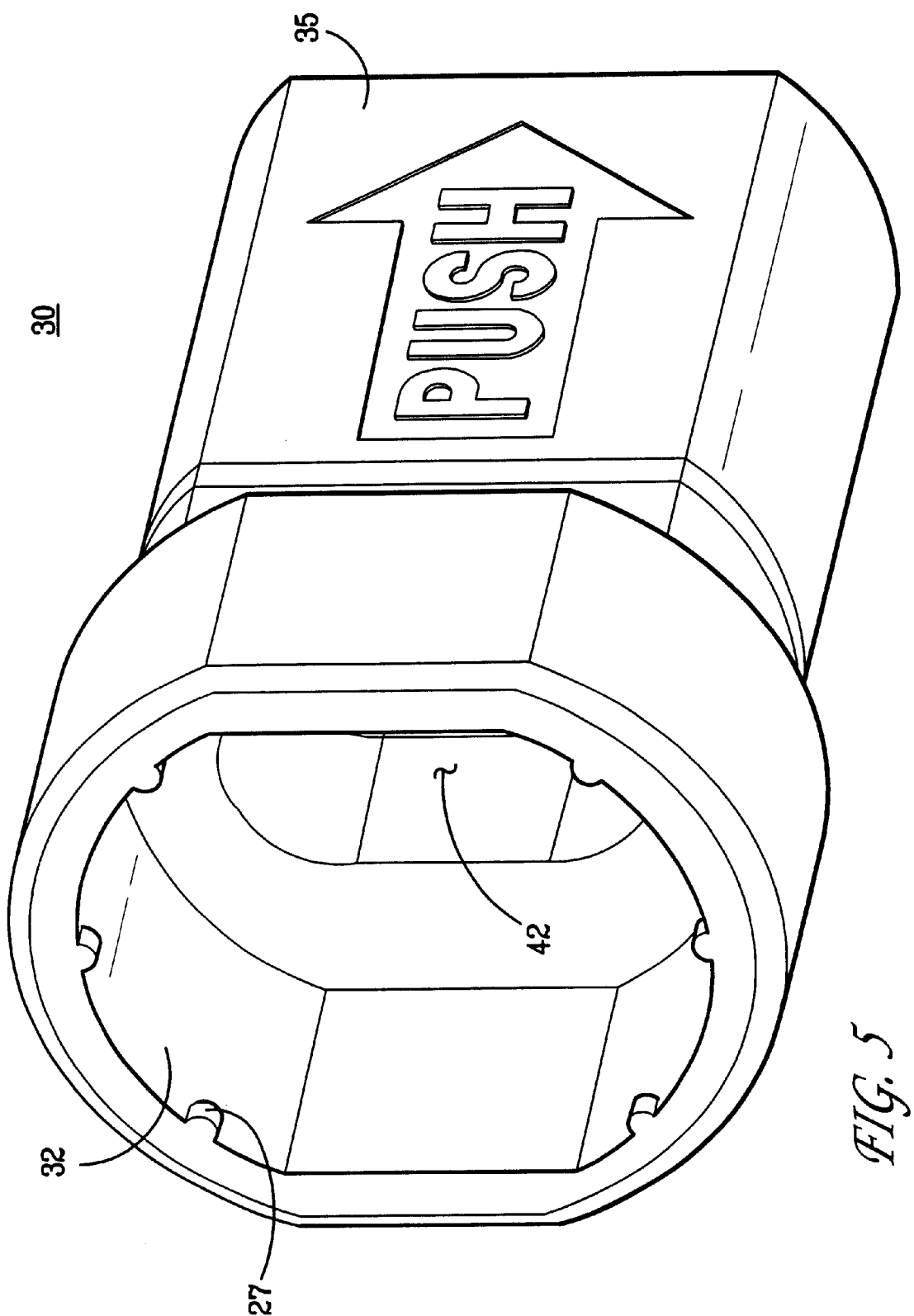
FIG. 5 is a perspective view of another exemplary termination plug in accordance with the present invention.

FIG. 5 is a perspective view of another exemplary termination plug 30 in accordance with the present invention. The termination plug 30 has a first end 32 to receive the cable 90 within passageway 42 and to connect with the guide boot 10. The first end 32 has a modified shape to receive a corresponding or complementarily shaped termination port 17 at a limited number (i.e., one or two) of positions. The terminal plug 30 has a second end 35 that is adapted to receive a portion of connector 100, or to connect with a connector panel or other device (not shown). In this manner, the cable 90 is provided to the connector, panel or other device. Again, termination plug 30 could be part of the optical connector where cable 90 terminates. It is noted that passageway 42 is shaped similarly to the shape of cable 90. Similar to opening 13, passageway 42 has a shape and size to receive cable 90 and to receive a rear end of connector 100.

Figure 6:
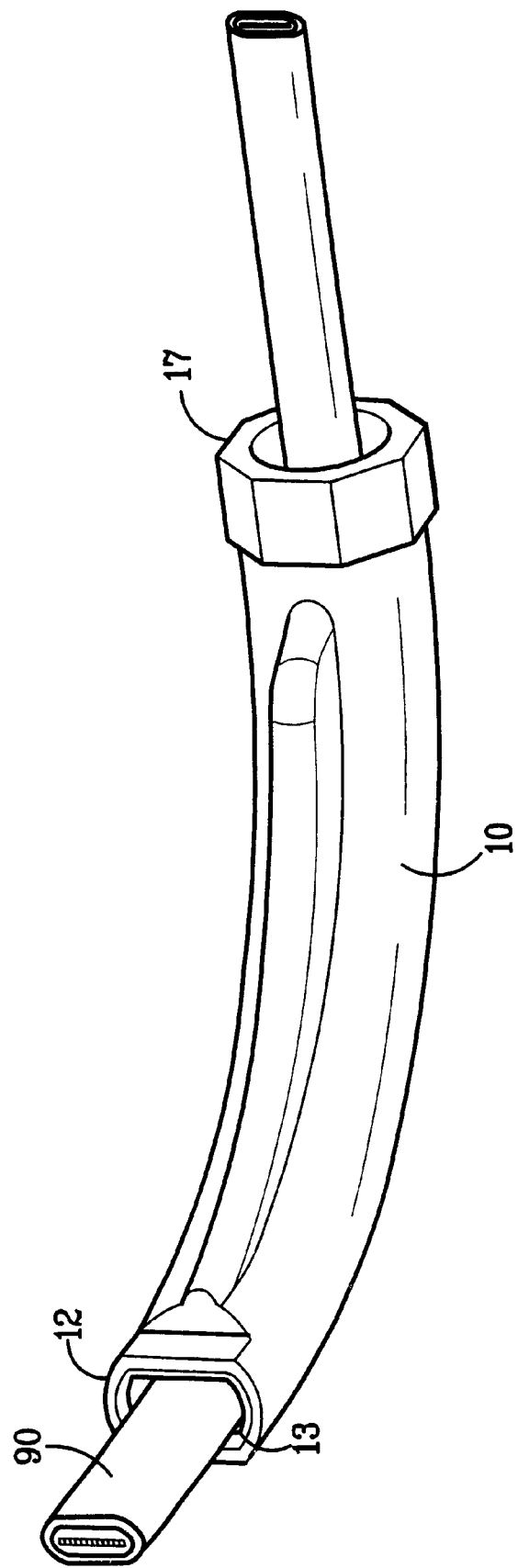
FIG. 6 is a perspective view of an exemplary guide boot with received cable in accordance with the present invention.

FIG. 6 is a perspective view of a guide boot 10 with cable 90 extending there through. In this manner, the cable 90 has the same orientation when inserted into the first end 12 and when exiting at the termination port 17. Before securing first boot section 10 to second boot section 20, first section 10 must be rotated relative to second section 20.

Figure 7:
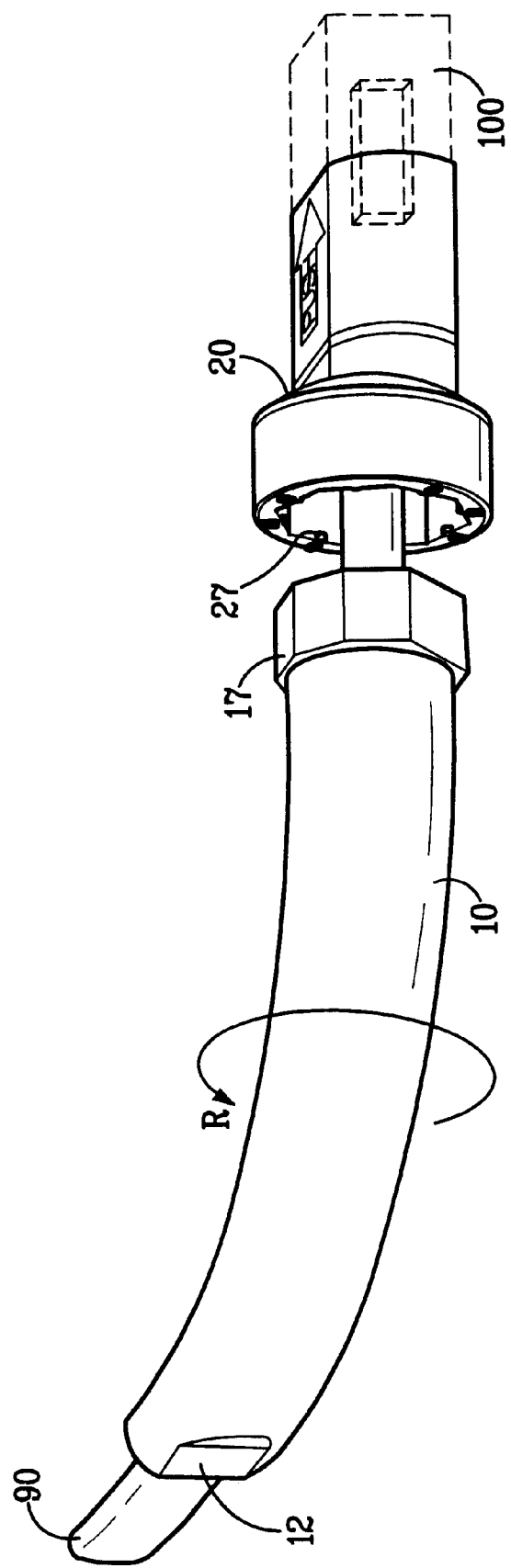
FIG. 7 is a perspective view (exploded) of an exemplary guide boot including termination plug with received cable in accordance with the present invention.
Figure 8:
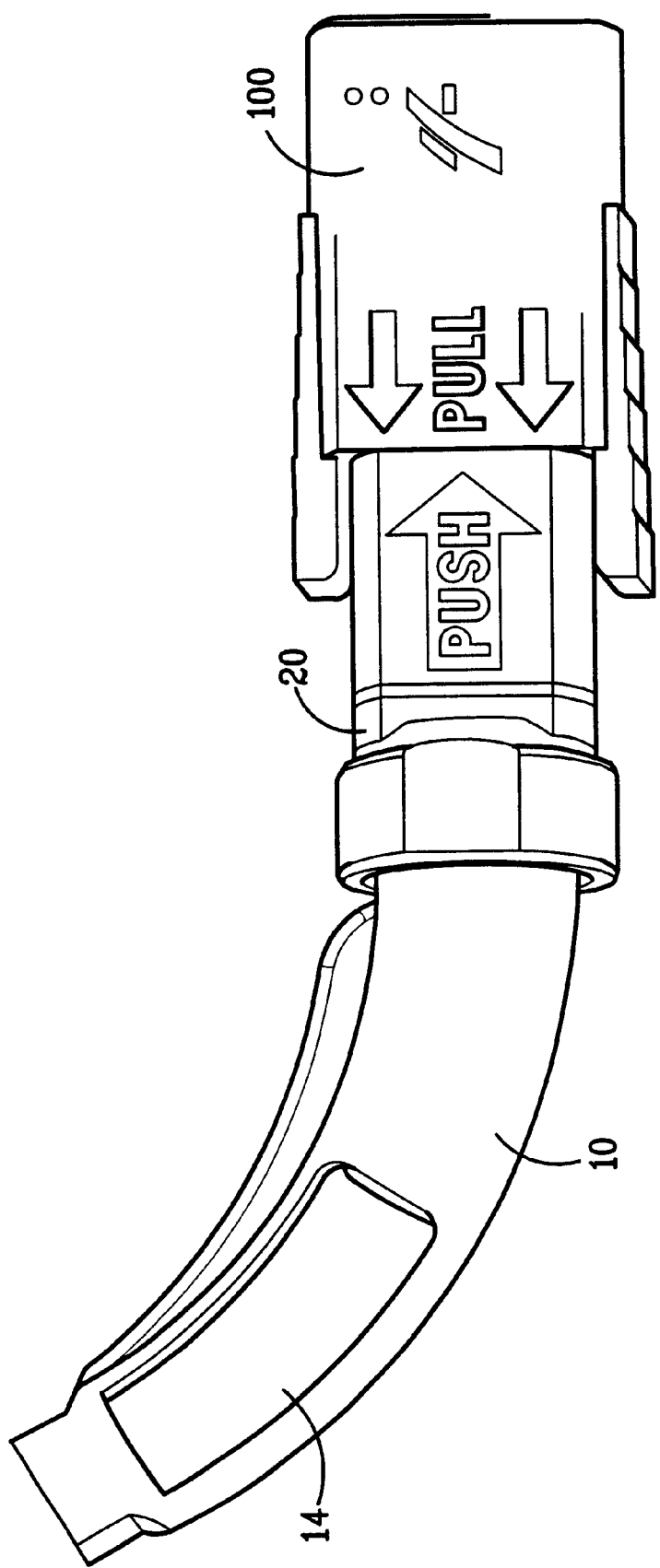
FIG. 8 is a perspective view of an exemplary guide boot with termination plug (assembled) inserted into a receptacle in accordance with the present invention.

FIG. 7 is perspective view of a guide boot 10 rotated along arrow R and just prior to engaging termination plug 20 in accordance with the present invention. The attaching of sections 10 and 20 is preferably performed by pushing the guide boot 10 onto the termination plug 20, and more particularly, is performed by inserting the termination port 17 into the first end 22 of the termination plug. The connection is then maintained (locked) by locking tabs 27 provided on the termination plug 20 that hold the termination port 17. The shapes of port 17 and end 22 complement one another to prevent rotation of first boot section 10 after locking.

As noted above, the cable 90 initially extends through the guide boot 10 without any twisting. The cable 90 is subsequently twisted or otherwise rotated when the guide boot 10 is rotated and then connected with the termination plug 20. More particularly, in such an embodiment, the cable 90 does not initially change its orientation as it passes through the guide boot 10. However, the orientation of the cable 90 is thereafter changed after passing the end of cable 90 into passageway 42 by rotating the termination port 17 of the guide boot 10. The termination port 17 is then inserted into the first end 22 of the termination plug 20 to connect the two devices and prevent rotation, i.e., maintain orientation, of the pieces. In this manner, the rotation is achieved by the relative orientation of opening 13 and passageway 42 due to their shapes corresponding to cable 90. Because the remainder of the inner passageway of the guide boot 10 is tapered, the cable 90 uses the entire length of first boot section 10 to rotate without interference. The termination port can be used to fix rotation to any amount that the user desires. It is contemplated that the first end 22 of the termination plug 20 will have preset tabs, notches, or other indicators to indicate to a user various angles of cable rotation such as −45 degrees, +45 degrees, or 90 degrees. In fact, boot 10 could secure to plug 20 without any rotation if the user does not desire any twist on the cable 90, and merely requires an angled boot assembly. In this manner, providing the cable at a circumferential angle is less complex because the cable can be inserted into the guide boot without any twisting, and then be twisted when the guide boot is attached to the termination plug.

Preferably, the cable assembly is assembled as follows. The cable 90 is inserted through the boot 10 and the plug 20. At this point, the boot 10 and the plug 20 are not connected together. The cable 90 is then terminated to the connector 100 in a known manner. The plug 20 is then secured to the connector 100, preferably by receiving the rear end of the connector 100 within the passageway 42 of the plug 20. Finally, the boot 10 is rotated, then secured to the plug 20. The cable assembly is now fully assembled. The cable assembly is then used to engage an adapter (not shown) on a panel (not shown) or other device.

Figure 9:
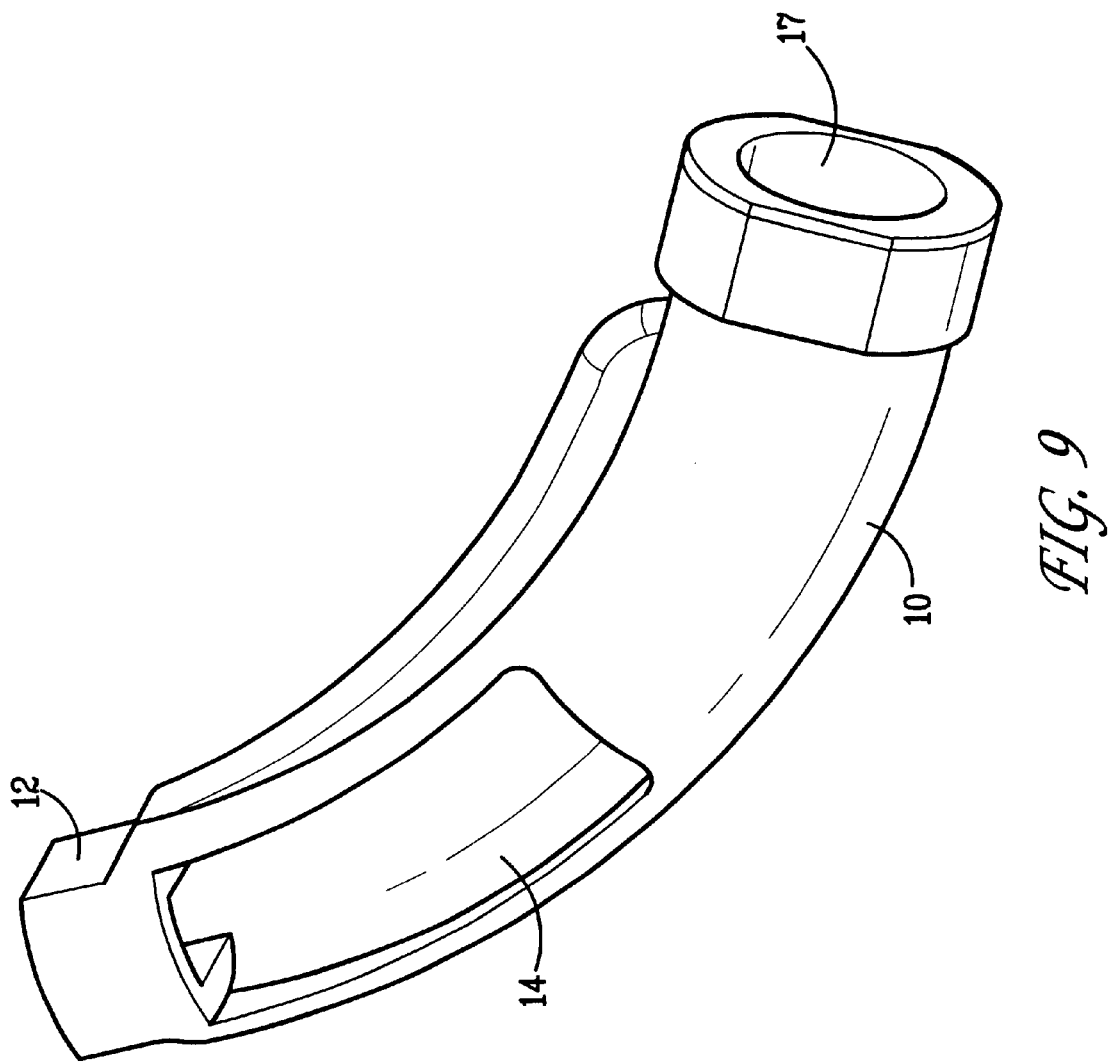
FIG. 9 is a perspective side view of another exemplary guide boot in accordance with the present invention.
Figure 10:
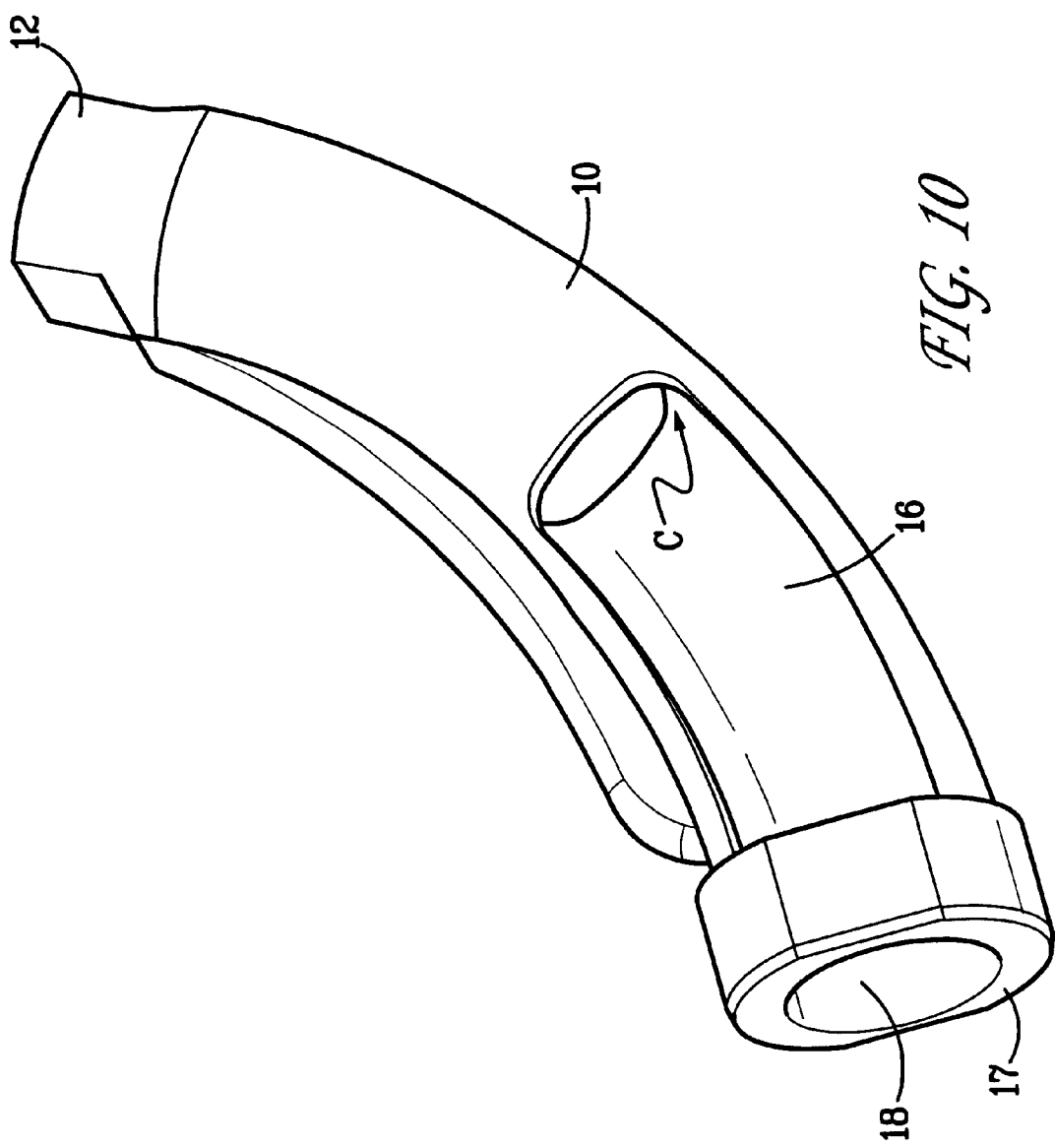
FIG. 10 is an opposing perspective side view of the exemplary guide boot of FIG. 9.

FIGS. 9–10 show the preferred embodiment of first boot section 10. In order to mold a curved section having an internal passage extending between continuous ends (i.e. without a slit or other break in the material), the mold pieces (not shown) preferably have features (not shown) that also form cut out windows 14, 16 along the length of first boot section 10. This allows the mold pieces to be separated from the first boot section 10 after the molding process.

Despite the presence of windows 14, 16, the internal passage maintains a continuous surface C (see FIG. 10) along the outer diameter of the bend section. This continuous surface helps guide the cable 90 through the bend. If necessary, the user may assist the cable 90 through the bend by reaching into the passage through a window 14, 16.

Figure 11:
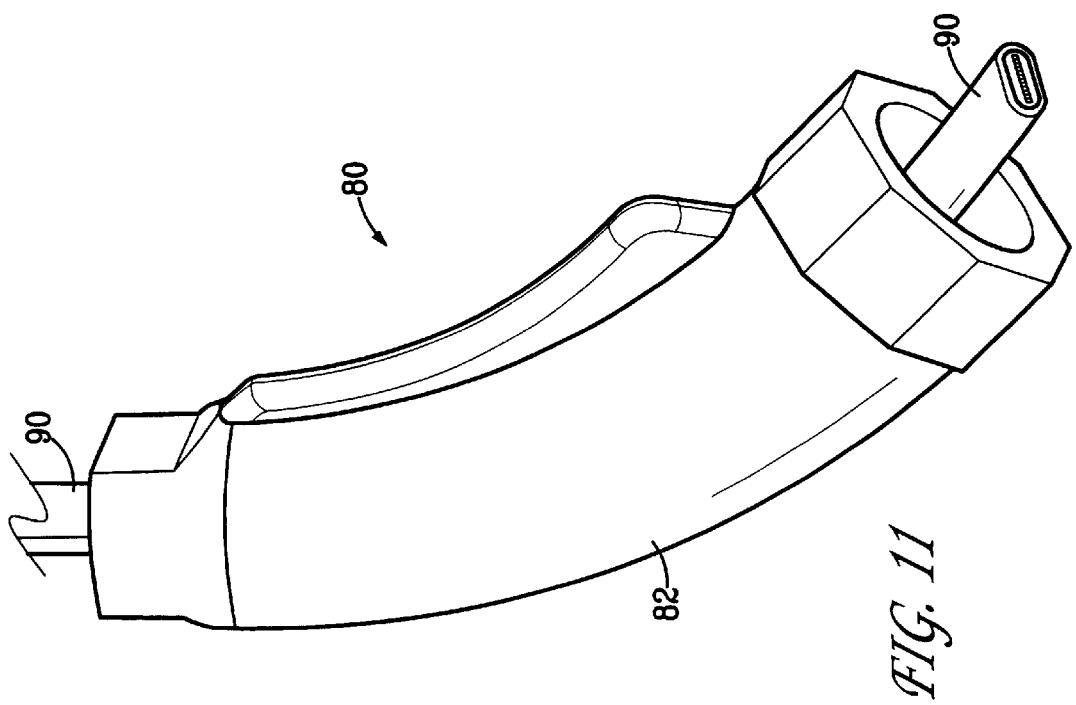
FIG. 11 is a perspective view of another exemplary guide boot with termination plug in accordance with the present invention.

FIG. 11 is a perspective view of a guide boot 82 with a 45° bend. This arrangement could be used when the connector mounts, for example, to an adapter mounted at a 45° angle on a front panel.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A two-piece boot assembly for use with a fiber optic cable, said boot assembly comprising:
   a guide boot comprising:
      a first end for receiving the fiber optic cable;
      a termination port at an end opposite the first end, from which the fiber optic cable extends, and
      a body disposed between the first end and the termination port and defining an inner passageway for the fiber optic cable; and
   a termination plug having a first end for receiving the fiber optic cable and a second end, the termination plug restraining the fiber optic cable from twisting and rotating in relation thereto.

2. The connector of claim 1, wherein the termination plug is adapted to be detachable connectable to the termination port of the guide boot.

3. The connector of claim 1, wherein the body is angled at a predetermined angle.

4. The connector of claim 3, wherein the predetermined angle is one of about 45 degrees and about 90 degrees.

5. The connector of claim 1, wherein the body has an outer diameter that decreases toward the first end.

6. The connector of claim 1, wherein the first end of the guide boot is oval-shaped.

7. The connector of claim 1, wherein the termination port has a round opening and an octagonal-shaped exterior.

8. The connector of claim 1, wherein the inner passageway is circular.

9. The connector of claim 1, wherein the termination plug further comprises locking tabs for locking the first end of the termination plug with the termination port.

10. The connector of claim 1, wherein the guide boot comprises a first cut-out window disposed on the body towards the first end and a second cut-out window disposed on the body towards the termination port.

11. The connector of claim 10, wherein the first cut-out window is disposed on an opposite side of the body from the second cut-out window.

12. The two-piece boot assembly of claim 1, wherein the first end of the guide boot receives a first portion of the fiber optic cable and restrains the first portion of the fiber optic cable from rotating and twisting in relation thereto, the first end of the termination plug receives a second portion of the fiber optic cable, and rotation of the guide boot to a first orientation in relation to the termination plug causes the first portion of the fiber optic cable to rotate and twist in relation to the second portion of the fiber optic cable.

13. The two-piece boot assembly of claim 12, wherein the guide boot mates with the termination plug when the guide boot is rotated to the first orientation in relation to the termination plug.

14. The two-piece boot assembly of claim 13, wherein the guide boot and the termination plug have complemeptary shapes that prevent the guide boot from rotating in relation to the termination plug when the guide boot is mated with the termination plug.

15. A fiber optic cable assembly, comprising:
   a connector;
   a fiber optic cable terminating at said connector; and
   a boot assembly for controlling said cable upon exiting from said connector, said boot assembly comprising:
      a termination plug adjacent said connector for receiving the fiber optic cable and restraining the fiber optic cable from twisting and rotating in relation thereto; and
      a guide boot mateable with said termination plug, said guide boot including:
         a first end opposite said termination plug for receiving said fiber optic cable;
         a termination portion adjacent said termination plug and from which said cable extends; and
         a body disposed between said first end and said termination portion and defining an inner passageway for said cable.

16. The fiber optic cable guide boot of claim 15, wherein the body is angled at a predetermined angle.

17. The fiber optic cable guide boot of claim 16, wherein the predetermined angle is one of about 45 degrees and about 90 degrees.

18. The fiber optic cable guide boot of claim 15, wherein the body has an outer diameter that decreases toward the first end.

19. The fiber optic cable guide boot of claim 15, wherein the guide boot comprises a first cut-out window disposed on the body towards the first end and a second cut-out window disposed on the body towards the termination port.

20. The fiber optic cable guide boot of claim 19, wherein the first cut-out window is disposed on an opposite side of the body from the second cut-out window.

21. The fiber optic cable assembly of claim 15, wherein the first end of the guide boot receives a first portion of the fiber optic cable and restrains the first portion of the fiber optic cable from rotating and twisting in relation thereto, the termination plug receives a second portion of the fiber optic cable, and rotation of the guide boot to a first orientation in relation to the termination plug causes the first portion of the fiber optic cable to rotate and twist in relation to the second portion of the fiber optic cable.

22. The fiber optic cable assembly of claim 21, wherein the guide boot mates with the termination plug when the guide boot is rotated to the first orientation in relation to the termination plug.

23. The fiber optic cable assembly of claim 22, wherein the guide boot and the termination plug have complementary shapes that prevent the guide boot from rotating in relation to the termination plug when the guide boot is mated with the termination plug.

24. A method of inserting a fiber optic cable into a connector comprising a guide boot having a first end and a termination port, and a termination plug having a first end and a second end, comprising:

inserting the fiber optic cable into the first end of the guide boot, through an inner passageway of the guide boot, and out the termination port;

inserting the end of the fiber optic cable received from the termination port into the first end of the termination plug;

rotating said guide boot in relation to the termination plug so that the end of the fiber optic cable rotates and twists in relation to a portion of the fiber optic cable positioned within the guide boot; and engaging the guide boot and the termination plug.

* * * * *

UNITED STATES PATENT AND TRADEMARK OFFICE
CERTIFICATE OF CORRECTION

PATENT NO. : 6,601,997 B2
DATED : August 5, 2003
INVENTOR(S) : Hung Viet Ngo

It is certified that error appears in the above-identified patent and that said Letters Patent is hereby corrected as shown below:

<u>Column 6,</u>
Line 14, the word "complemeptary" should be typed as the word -- complementary. --

Signed and Sealed this

Fourth Day of November, 2003

JAMES E. ROGAN
*Director of the United States Patent and Trademark Office*